Jan. 5, 1965 F. TUCZEK 3,164,381
VIBRATION DAMPING SHOCK ABSORBERS
Filed Nov. 14, 1962 2 Sheets-Sheet 1

INVENTOR
Franz Tuczek
By
Bailey, Stephens & Huettig
ATTORNEYS

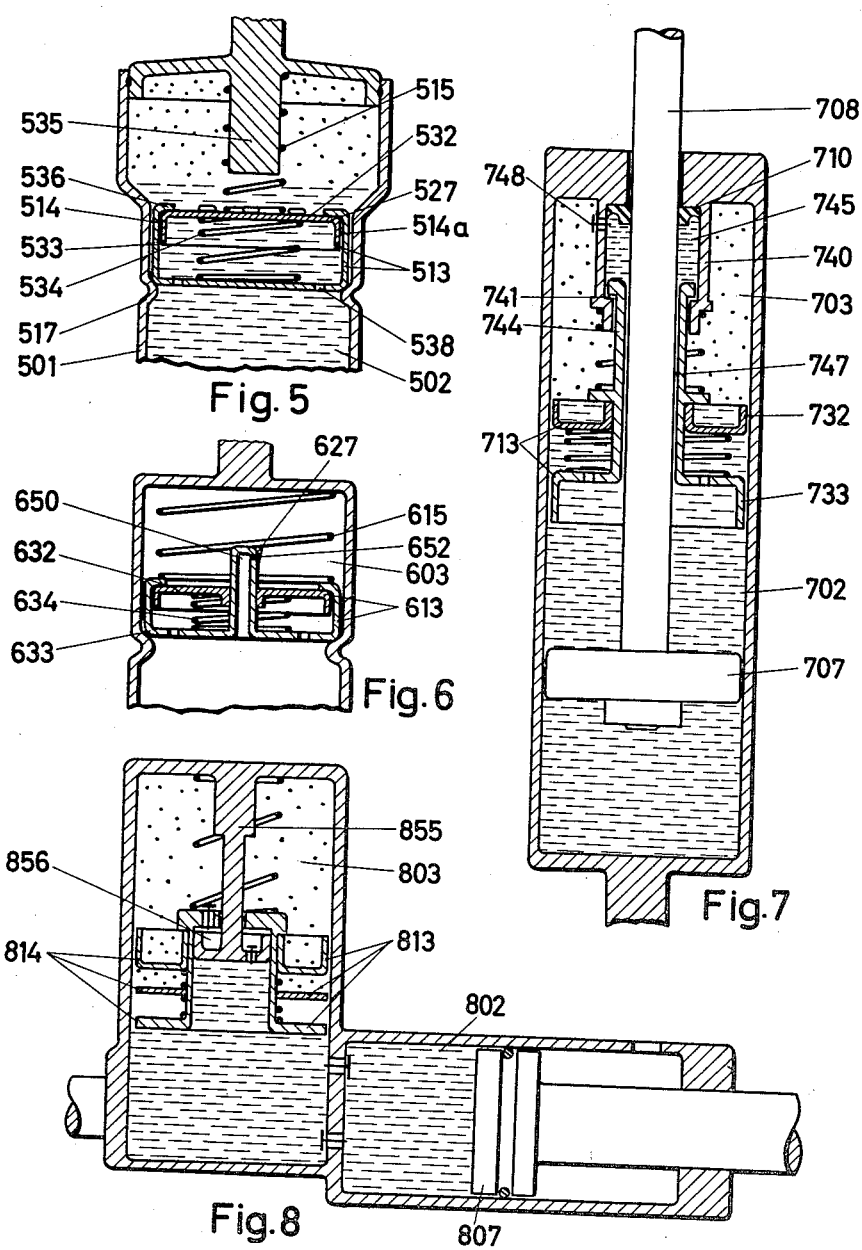

United States Patent Office 3,164,381
Patented Jan. 5, 1965

3,164,381
VIBRATION DAMPING SHOCK ABSORBERS
Franz Tuczek, Eitorf, Sieg, Germany, assignor to Boge G.m.b.H., Eitorf, Sieg, Germany
Filed Nov. 14, 1962, Ser. No. 237,592
Claims priority, application Germany, Nov. 22, 1961, B 64,872
12 Claims. (Cl. 267—64)

The invention relates to vibration damping shock absorbers, especially for motor vehicles, of the hydro-pneumatic type.

Such shock absorbers have a cylindrical working space filled with oil in which a working piston is movable and a gas cushion which maintains a pressure on the oil in a separate equalizing chamber, with a movable separating body located in the area of the separating surface between the oil and the gas cushion, which allows passage of oil through it.

If in such dampers the free upper surface of the oil is agitated and thus the oil is mixed with gas, there exists in the two working spaces, between which the damping pressures are exerted, a gas-oil mixture. This results in an elasticity in the two working spaces because of the compressibility of the gas, which disturbs the operation of the damping forces. Especially the damping force is, at the point of reversal of movement, not, as it should be, zero, because a pressure differential exists between the two working spaces, which cannot be immediately equalized. On the contrary, if a volume of oil is provided in one working space with an undisturbed surface and only in the other one the oil is present along with the elastic gas cushion, this disturbance does not exist, but at the reversal point the damping pressure is zero, because the oil is not compressible by the pressures existing in the shock absorber and equal pressures exist at once in the two working spaces. If the volume of gas is small in comparison to the volume of oil, the disturbance of the damping forces by mixing of the gas and oil has no substantial disturbing effect. The disturbance is however serious in a long stroke shock absorber or one in which a greater reserve of oil must be provided for the heat expansion of the oil, and the gas volume must be large compared to the oil volume.

In a known long stroke shock absorber of this type, the movable separating body provided in the area between the oil and the gas cushion counteracts the harmful forming of an emulsion by the use of a sieve-like construction, so that the large air bubbles of the emulsion cannot be drawn through the fine sieve-openings upward into the working space of the shock absorber. The mixture of oil and air then has the consequence that the sieve no longer follows the dispersement of the oil surface, but sinks down and no longer prevents the passage of fine bubbles of the emulsion.

The prevention of the admixture of gas and oil by movable separating walls, for example by membranes or tight separating pistons, is known. The membranes have the disadvantage that in long stroke dampers and dampers with a large range of heat expansion of the oil they undergo large deformations, which lead to damage. With separating pistons, the sealing of the pistons on the cylinder wall involves considerable accuracy in their surface qualities. The sealing rings used for tightening produce a high frictional force, which operates unfavorably on the course of damping.

There are also known, for separation of the oil and gas, pistons floating on the light oil. The formation of such floating pistons of multi-celled or single celled hollow bodies presents difficulties, because the walls of the cells, in which naturally during the production of the bodies an atmospheric pressure exists, must be very strong, if the hydro-pneumatic damper is filled for example with a pressure of 20 atmospheres and this pressure in the course of the different operating positions can rise to 100 atmospheres or more. This causes great danger that the cell walls will collapse and the buoyancy of the pistons will be lost.

The invention relates to an improvement of hydro-pneumatic shock absorbers, in which the mixing of oil and gas which is connected with the disturbance of the free surface influences very little, if at all, the efficiency of the damper.

The damper according to the invention is characterized by the fact that the separating body is constructed as a piston, which forms a narrow annular space with the inside wall of the equalizing chamber which is filled with fluid through capillary attraction. In contrast to the known device with a movable sieve for preventing or reducing mixing, the annular space provided for the passage of oil provides the capillary attraction for a large surface area compared to the transverse cross section, whereby a rapid passage of oil during operation of the shock absorber is effectively prevented, so that the separating piston follows accurately the theoretical dividing surface between the oil and air and is sealed against the undesired passage of air into the working space about as well as in the known constructions with piston-ring sealed separating pistons or the separating membranes which are subject to damage.

If in such a damper an undissolved portion of the gas present in the working cylinder is kept small or is altogether excluded, the heretofore described undesired disturbance of the damping forces through mixture of oil and gas is avoided. If in the equalizing chamber a mixture of oil and gas exists, it does not pass into the working cylinder.

Advantageously, the separating body has no special requirements as to the qualities of its surface in its shortened travel in the cylinder. The separating body is not disturbed by the pressure of the gas cushion, because it is not formed of cells but of a solid wall. The base position can, in order to obtain a smaller structural length, be so selected that the working piston at the end of its stroke engages the separating body and carries it with it. In its simplest form the separating body has no valves.

The separating body does not so much serve the purpose of separating the working cylinder from the equalizing chamber, but rather the purpose, through the expansion force of the gas cushion exerted on the surface of the separating body, to accelerate and to retard the fluid present in the working cylinder in synchronism with the increasing and decreasing varying piston volume without permitting gas in disturbing amounts to pass from the equalizing chamber to the working cylinder, the oil adhering through capillary attraction in the narrow space between the piston skirt and the cylinder wall serving in a sufficient degree as a seal. Thus it is immaterial whether the fluid in the working cylinder exists as clear oil or as an oil-gas mixture and whether in the equalizing chamber only gas or gas and oil are present.

If in a damper according to the invention in the position of rest the working cylinder is filled with clear oil and the oil level in the equalizing chamber stands above the separating body, even with violent movements of the damper the oil in the working cylinder remains clear, although in the equalizing chamber the oil is mixed with gas. Tests have shown that this is true not only if the working piston, but also if the working cylinder is moved violently. A further proof of the adequate sealing of the separating body is observed if the oil in the working cylinder at the beginning of the movement is cloudy because of gas bubbles floating in it, and after a movement is clear, in that with the increasing pressure of the gas cushion, and oil, through the heating and expansion of the oil, according to known physical principles the capacity of the oil to dissolve gas increases and the gas bubbles disappear.

A mechanical spring pressure exerted on a separating body should be so slight that it has no influence on the extent of the damping forces. The spring forces should only be enough so that the separating body returns to its normal position which may be determined by a stop or abutment. This abutment can be either above or below the separating body. The mechanical spring force acting on the separating body is so weak and the sealing of the gap so strong that even during slow piston rod movements a movement of the separating body occurs and no spatial connection between the working cylinder and the equalizing chamber takes place.

The mode of operation of the damper during the in and out movements of the working piston is such that in the same stroke the working body makes corresponding but smaller strokes back and forth. If the first movement of the working piston is such that it corresponds to a movement of the separating body away from its base position, the in and out movement of the separating body immediately assumes the proper strokes. If the first movement of the piston is such that the separating body is pressed into its base position against an abutment, then according to whether the position of the abutment is above or below the piston a corresponding body of fluid is transferred from the working cylinder into the equalizing chamber or vice versa, the space between the piston skirt and the cylinder wall constituting then a spatial connection for this purpose. At the reversal of movement of the working piston the back and forth movement of the separating body is set in the correct cycle.

For obtaining the above described spatial connection also special openings or valves can be provided in the separating body. Advantageously these openings promote the passage of gas out of the separating chamber into the working cylinder, in that they have a small oil-filled cross section. For the withdrawal of gas from the operating chamber into the equalizing chamber, the arrangement with an abutment lying beneath the separating body has the special advantage that a positive pressure differential between the pressure underneath the separating body and the lower pressure thereabove resulting from the spring load on the separating body is produced. In all forms the gas naturally has a tendency to move upward and the oil to move downward. In another modification of the invention the separating body can be formed of several interfitting pistons. These can also in cooperation with one another or any other part of the damper have a pumping action, in that in a suitable manner a widening and then narrowing hollow space is provided, for example for passing fluid enriched with gas from the working cylinder into the equalizing chamber.

If the working range of the separating body is so selected that the working piston at the end of its stroke comes in contact with the separating body, advantageously a hydraulic stop pressure can be exerted, which through corresponding construction of the valve can be maintained at the desired pressure.

Further objects and advantages of the invention will appear more fully from the following description, particularly when taken in conjunction with the accompanying drawings which form a part thereof.

In the drawings:

FIGS. 5 and 6 show separating bodies formed of two parts;

FIG. 7 shows an arrangement in which the separating body is mounted around the piston rod; and FIG. 8 shows an arrangement in which the main working cylinder is arranged horizontally, while the separating body is positioned in an equalizing chamber forming an angle with the direction of movement of the working piston.

Figure 1:
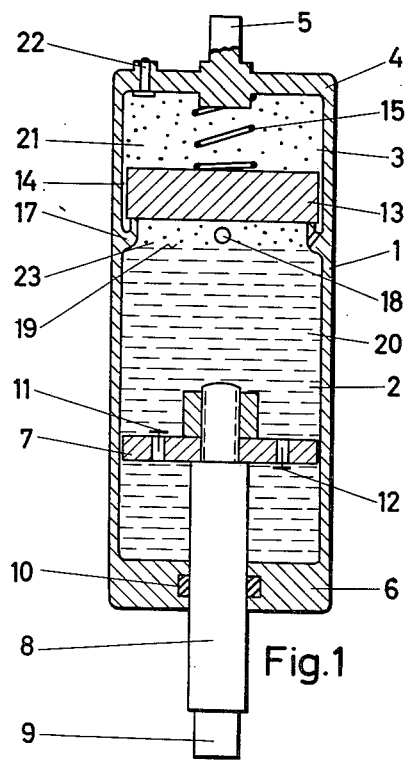
FIG. 1 shows in cross-section a vibration damping shock absorber according to the invention with the abutment below the separating body.

In the form of FIG. 1, the cylinder housing 1 encloses the working cylinder 2 and the equalizing chamber 3. At one end it has a closure wall 4 with a connecting member 5 and at the other a bottom wall 6. The working piston or main piston 7 which moves in the working cylinder 2 to produce damping forces by means of valves 11 and 12 is secured on the end of the piston rod 8 which has a connecting piece 9. The connecting pieces 5 and 9 are, for example, connected to the vehicle axis and the vehicle body respectively. The piston rod 8 passes through the cylinder bottom 6 and is sealed therein by the sealing ring 10. The skirt of the separating piston 13 (which is of substantial length in a direction parallel to the cylinder axis) forms with the cylinder wall of the equalizing chamber 3 the narrow annular space 14. For example, the width of the space can vary between 0.05 mm. and 0.1 mm. This space is of capillary width. Under the operation of spring 15, the separating body 13 rests on the projection 17 of the cylinder housing 1 and this represents the base position. In the base position a connection exists between the equalizing chamber 3 and the working cylinder 2 through the openings 18 into the groove above the projection 17 and then through the capillary space 14. FIG. 1 shows the device in stationary position of the main piston 7 in which the oil level 19 is below the separating body 13. The gas cushion 21 can be, in a known manner, filled though the check valve 22. A small proportion 23 of the gas is located in the working cylinder 2.

If during slow movements of the main piston 7 the oil does not become mixed with the portion of gas in the working cylinder, the oil level 19 moves corresponding to the stroke of the piston up and down, so that the separating body 13 either remains at rest and the gas passes through the space 14 or the separating body is moved up and down correspondingly, if the space 14 is filled with oil, a sealing off of the spaces above and below the separating body is produced. If during rapid movement of the main piston the oil 20 is mixed with the gas 23 in the working cylinder 2, an oil film is maintained continuously in space 14 and thus a separation is maintained. The separating body 13 then moves corerspondingly with and in a degree corresponding to the inward movement of the working piston. During movement of the working piston at lower speeds the separating body 13 is lifted to a lesser degree from its seat than corresponds to the volume of the piston rod, and upon downward movement it stops for a short time in the base position, while the working piston 7 moves further downward. During this time there is a connection through the space 14 and openings 18.

If the small quantity of gas 23 of the working cylinder mixes with the oil 20, the disturbance of the damping procedure remains within permissible bounds compared to the disturbance which is produced if the separating body 13 is omitted and the gas portion 21 lying above it is mixed with the oil. The disturbance of the damping function occurs for example in the downward stroke, through the condition that the air bubbles floating in the oil beneath the main piston 7 must first be compressed to such a degree that the pressure is built up which is necessary to force the oil through the valve 11. The movement of the piston backwardly is naturally greater if more air is intermingled, and only small if the amount of gas 23 beneath the separating body 13 is small compared with the volume of the oil 20.

If the oil level 19 through other movements of the working piston 7 or through the heat expansion of the oil or through other circumstances is higher than is shown, for example above the separating body 13, the oil 20 even with vigorous damping movements of the piston in the working cylinder 2 remains clear and no spatial connection exists between the spaces above and below the separating body. This condition remains true even if the oil above the separating body 13 is mixed with gas.

Figure 2:
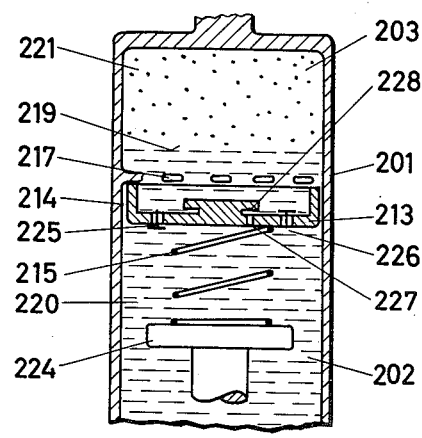
FIG. 2 is a cross-section through such a device in which the abutment is positioned above the separating body.

In the form of FIG. 2, the oil level 219 lies above the separating body 213. The separating body 213 has valve 225, 226 and openings 227, which make possible a spatial conection between the spaces above and below the separating body, by which the upward movement of gas can be promoted, whereas the passage of the gas from above downwardly is made more difficult, especially through the spaces 228 which are filled with oil. The separating body 213 engages under the operation of spring 215 the projections 217 of the cylindrical tube 201 which lie above the separating body. The spring 213 rests on a suitable damper part 224, which can be a part of the main piston.

The annular capillary space between the separating body and the cylinder wall is indicated at 214.

Figure 3:
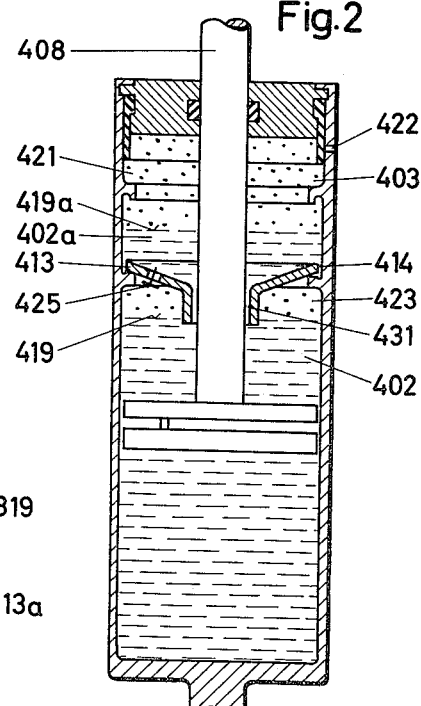
FIG. 3 is a similar cross-section in which the separating body is held in its base position by means of two springs.

In FIG. 3, the separating body 313 is positioned between two oppositely acting springs 315 and 315a. The oil level 319 is located, corresponding to the sloping position in part above and in part below the wall 313a of the separating body 313. Even with this slanting positioning the operation of the damper remains the same. The separating body 313 has an annular capillary space between it and the wall of the cylinder.

Figure 4:
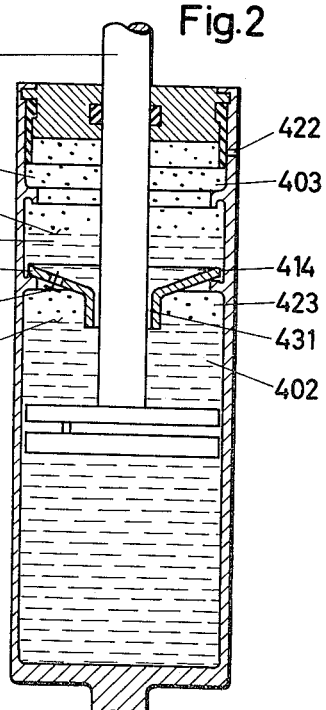
FIG. 4 shows a separating body which is acted upon by gravity.

In FIG. 4, the equalizing space 403 and the separating body 413 surround the piston rod 408. The separating body 413, which is urged by gravity to its base position, in which it is shown, forms with the cylinder wall of the equalizing space 403 a capillary annular space 414, and with the piston rod 408 a space 431. In the position of rest shown in the drawing, the oil level 419 is below the separating body and the equalizing space 403 is partly filled with oil up to the oil level 419a and partly of gas. The gas portion 423 by movement of the damper and mixture with the oil produces a slight disturbance of the damping force. Through the valve 425 the oil 402a flows into the working chamber and the gas 423 passes through the space 14 into equalizing space 403.

In FIG. 5, the separating body 513 consists of two interfitting separating pistons 532 and 533 which move inward and outward under the pressure of spring 534 until the piston 532 abuts against a shoulder 536 of piston 533. A spring 515, which is weaker than the spring 534, moves the separating body 513 into the selected base position. The separating body 513 moves as a whole in the cycle produced by the main piston. If the separating body rests on the projections 517 of the cylinder 501 and through the movement of the main piston a relative under-pressure is produced beneath the separating body, the piston 532 can be drawn downward against the resistance of spring 534 and can force fluid into the working space through the opening 538. If the separating body 513 upon upward movement rests against the stop 535, a further movement of the piston 533 can take place against the resistance of spring 534 upwardly, so that fluid can flow through the annular capillary space 514a between the pistons 532 and 533.

In the form of FIG. 6, there is a similar separating body 613 formed of two pistons 632, 633, in which the piston 633 engages spring 615. The gas separation is produced through a channel 650 with an opening 627 into the equalizing space, which can be provided with a check valve 652.

In the form of FIG. 7, the piston 732 and 733 cooperate in a similar manner, but these are mounted around the piston rod 708. A cylindrical projection 740 has an inward projection 741 against which can engage the enlarged end of pipe 744 which is rigid with separating member 733.

This latter projection forms with the wall 740 a pump, the space of which is filled with oil through the piston rod space 747 and which can force the oil through a check valve 748 into the equalizing chamber 703. The flow of the fluid through the space 747, the space 745 and the check valve 748, as well as through other passages, is promoted by the positive pressure differential between the working cylinder 702 and the equalizing chamber 703. Thus it is assured that the rod seal 710 will not run dry.

In FIG. 8, the equalizing chamber 803 is arranged at an angle to the working cylinder 802, so that the working piston 807 operates horizontally. The separating body 813 consists of several pistons.

The abutment or stop is formed by an arrangement 855, which contains a pump space 856. This constantly pumps a part of the fluid from the operating cylinder 802 into the equalizing space 803, so that a complete removal of air from the working cylinder 802 can be obtained. The return oil flow from the equalizing space 803 into the working space 802 is possible through the annular capillary space around parts 814 but the passage of gas from above downwardly is prevented.

While I have described here some embodiments of my invention, I wish it to be understood that I do not intend to limit myself thereby except within the scope of the claims hereto or hereinafter appended.

I claim:

1. A hydro-pneumatic shock absorber comprising means forming a cylindrical oil-containing working space, a main piston movably mounted in said working space, and a closed equalizing space in the working space containing with gas under pressure above the oil, a separating body in the area of the separating surface between the oil and the gas under pressure, said separating body comprising a solid substantially non-porous member extending substantially across the unobstructed interior of the equalizing space and having between its outer edge and the interior of the wall of the equalizing space an open annular gap of capillary dimension, said separating body being urged in one direction, said working space forming means and said separating body having cooperating means therein located substantially at the upper level of the oil in the working space to limit the movement of the separating body in the direction in which it is urged.

2. Apparatus as claimed in claim 1, in which said separating body has at least one skirt of substantal length in a direction parallel to the axis of the cylinder around its periphery.

3. In an apparatus as claimed in claim 1, said limiting means including a projection of the interior wall of the working space forming means.

4. In an apparatus as claimed in claim 3, said projection being below the separating body.

5. In an apparatus as claimed in claim 3, a relatively weak spring urging said separating body into engagement with said projection.

6. In an apparatus as claimed in claim 3, said limiting means including a projection being located above the separating body, and a spring operatively associated with the separating body urging the separating body towards engagement with the projection.

7. An apparatus as claimed in claim 1, including springs associated with said separating body on opposite sides thereof urging the same to an intermediate position.

8. An apparatus as claimed in claim 1, in which said separating body is formed of a plurality of piston parts relatively movable with respect to each other.

9. In an apparatus as claimed in claim 8, pump means operatively connected with one of said piston parts for producing movement of fluid between the main cylinder and the equalizing chamber upon movement of such part.

10. In an apparatus as claimed in claim 1, said piston having such a length of stroke as to engage said separating body at one end of the stroke of the piston.

11. An apparatus as claimed in claim 1, in which the movable separating body is slidably mounted on and movable with respect to the piston rod.

12. An apparatus as claimed in claim 1, in which the separating body has passages therethrough and check valves in said passages.

References Cited by the Examiner
UNITED STATES PATENTS

| | | | |
|---|---|---|---|
| 2,317,796 | 4/43 | Nielebock | 138—31 |
| 2,724,590 | 11/55 | Irwin | 267—64 |
| 2,774,446 | 12/56 | De Carbon | 267—64 X |
| 2,828,960 | 4/58 | Lucien et al. | 267—64 |
| 3,112,115 | 11/63 | Smith | 277—235 A |

FOREIGN PATENTS 648,931  1/51  Great Britain.

ARTHUR L. LA POINT, *Primary Examiner*.